(No Model.)
J. H. & T. K. BARLEY
HAY STACKER FORK.
No. 324,636. Patented Aug. 18, 1885.
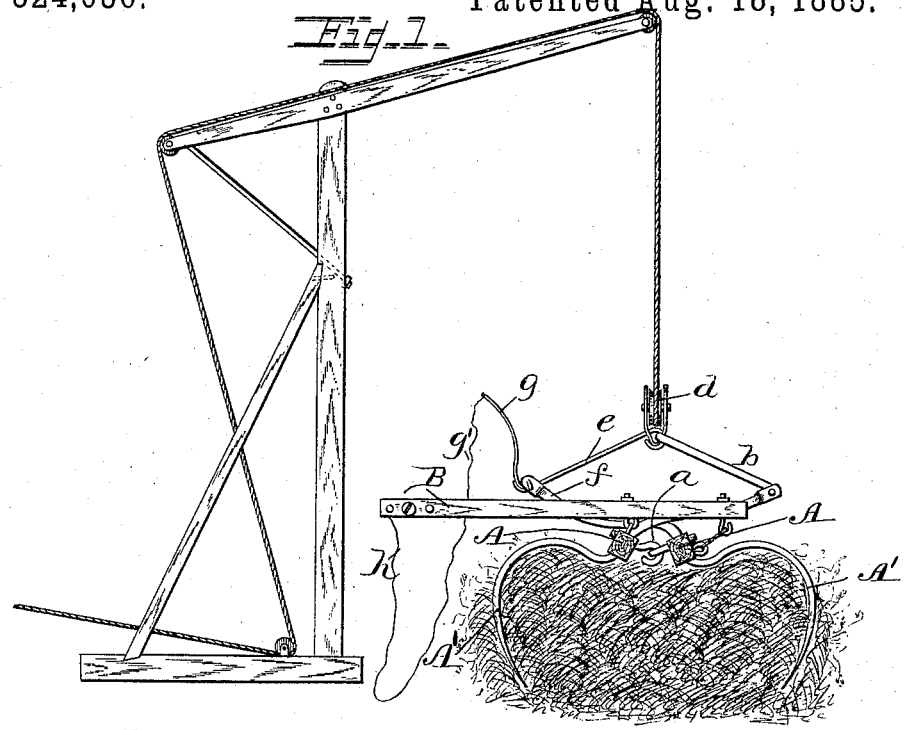
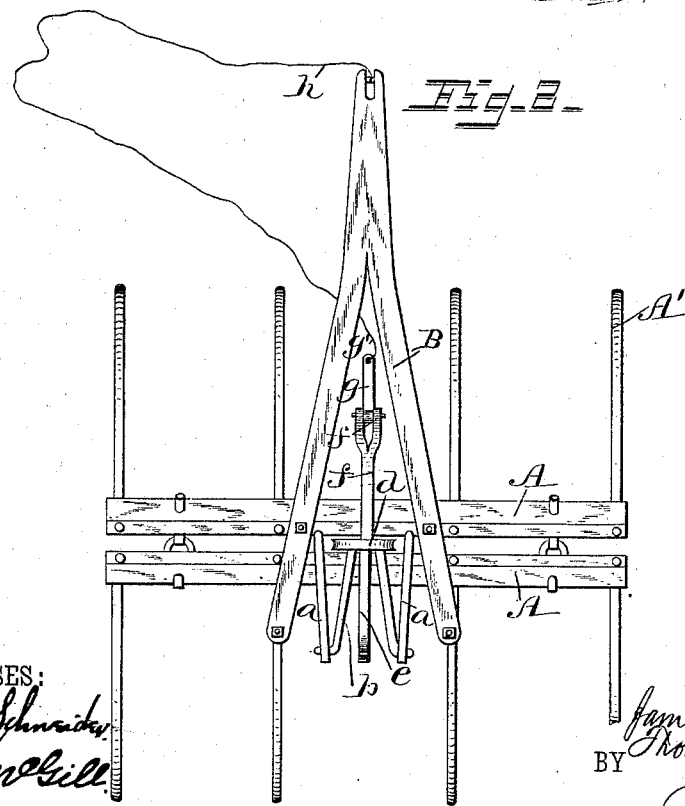
WITNESSES:
INVENTORS
James H. Barley
Thomas K. Barley
BY Myers & Co
ATTORNEYS

UNITED STATES PATENT OFFICE.

JAMES H. BARLEY AND THOMAS K. BARLEY, OF SEDALIA, MISSOURI.

HAY-STACKER FORK.

SPECIFICATION forming part of Letters Patent No. 324,636, dated August 18, 1885.

Application filed October 28, 1884. (No model.)

*To all whom it may concern:*

Be it known that we, JAMES H. BARLEY and THOMAS K. BARLEY, citizens of the United States of America, residing at Sedalia, in the county of Pettis and State of Missouri, have invented certain new and useful Improvements in Hay-Stackers, of which the following is a specification, reference being had therein to the accompanying drawings.

This invention pertains to improvements in hay-forks; and it consists of the combinations of parts with their construction, substantially as hereinafter fully set forth and claimed, whereby the fork may be carried a considerable distance from the hoisting-pole and caused to receive or grasp the hay or straw either in a loose or compact state, and to effect the convenient manipulation of the fork in discharging its contents, together with preventing the swaying of the loaded fork while being elevated by the action of the wind.

In the accompanying drawings, Figure 1 is a side view of the fork in connection with the hoisting contrivance, said fork being in the act of grasping the hay or straw upon the ground, and Fig. 2 is a plan view of the fork.

In the embodiment of this our invention we employ either two heads or bars, A, or a single head or bar. In the use of two heads the tines A', of an outwardly, downwardly, and inwardly curved shape, are fixedly connected thereto, while said heads are hinged or articulated together. In the use of a single head the tines themselves are pivoted or hinged to said head. Of these two forms of effecting the separation and bringing together of the tines, which is the object of the foregoing, we prefer the employment of the two heads or bars, because permitting of the use of simpler mechanism to effect the manipulation of said tines. These heads A are hinged or articulated also to a pronged or bifurcated handle, B, each at two points upon each prong of said handle, or it may be made of a single piece, and can be dispensed with at pleasure. Said bars or heads may also be extended or elongated to provide for the attachment thereto of additional tines to increase the holding capacity of the fork, if desired; also the hinges connecting the tine-heads of said fork may be so constructed and arranged as to place said heads at any desired distance apart, and thereby increase the grasping capacity of said fork. To one of the heads A are rigidly connected two upright arms, $a$, inclining slightly rearwardly toward each other at their upper ends. To the said ends of these arms are pivoted or hinged the ends of a bail, $b$, upon whose cross-bar is pivoted or looped the block of a pulley, $d$, the function of which will be seen hereinafter.

Upon the looped or bail cross-bar embracing portion of the pulley-block is hinged or pivoted a latch, $e$, while secured to the other head A is a forwardly curved or inclined arm, $f$, having at its upper end an eye, $f'$, which receives, when the tines are grasping the load of the fork, the free abruptly-curved end of the latch $e$.

$g$ is a trip-lever connected to the cross-bar of the eye $f'$ of the arm $f$, and to this lever is connected a line or cord, $g'$, which extends forward and downward contiguously to the hoisting-pole and unites with a line or cord, $h$, depending from the forward end of the fork-handle B, and which the operator grasps and holds while the fork is being elevated with its load. This fork is applied to a suitable hoisting pole and rope, as shown in connection therewith, said pole and rope being covered in another application, and the operation thereof being readily understood from a reading of the drawings it is not necessary to further refer to the same herein.

When the fork has been elevated, the operator pulls the connected lines of the handle and trip-lever, when the tines of the fork will spread and release the load, permitting its disposition upon the rising stack.

The details as to construction of the parts may be varied without departing from the spirit of our invention.

Having thus fully described our invention, what we claim, and desire to secure by Letters Patent, is—

1. The fork with its tine-heads provided with fixed arms having a pivoted bail provided with a pulley, substantially as shown, and for the purpose set forth.

2. The fork with one of its tine-heads provided with fixed arms having a pivoted bail provided with a pivoted arm, and with its other tine-head provided with a fixed eye bar or arm having a trip-lever, all substantially as shown, and for the purpose set forth.

3. The fork having its tine-heads hinged together and provided with fixed arms having a pivoted bail provided with a pivoted arm, and having a trip-lever, substantially as and for the purpose set forth.

4. The fork having its heads hinged together and provided with tines and the handle of the fork connected to said heads, substantially as and for the purpose set forth.

5. The fork having its heads hinged together, as shown, and provided with a series of fixed tines of an outwardly, downwardly, and inwardly curved shape, said heads provided with suitable means for opening and closing the tines of said fork, substantially as shown, and for the purpose specified.

In testimony whereof we affix our signatures in presence of two witnesses.

JAMES H. BARLEY.
THOMS. K. BARLEY.

Witnesses:
JAMES M. BYLER,
M. M. BYLER.